(12) United States Patent
Bruss

(10) Patent No.: US 8,403,734 B2
(45) Date of Patent: Mar. 26, 2013

(54) VENT CONTROL SYSTEM

(75) Inventor: Paul Thomas Bruss, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 905 days.

(21) Appl. No.: 12/390,050

(22) Filed: Feb. 20, 2009

(65) Prior Publication Data

US 2010/0216386 A1 Aug. 26, 2010

(51) Int. Cl.
*B60H 1/00* (2006.01)
*B60H 1/34* (2006.01)
*F24F 7/00* (2006.01)

(52) U.S. Cl. .................... 454/136; 454/155; 454/314

(58) Field of Classification Search ............... 454/136, 454/155, 314; 165/42, 202
See application file for complete search history.

(56) References Cited

U.S. PATENT DOCUMENTS

| | | | | |
|---|---|---|---|---|
| 3,422,695 A * | 1/1969 | Wilson et al. | ............... | 74/421 A |
| 4,086,481 A * | 4/1978 | Jenkinson | ............... | 362/428 |
| 4,350,472 A * | 9/1982 | Morimoto | ............... | 415/125 |
| 4,656,926 A * | 4/1987 | Bauer et al. | ............... | 454/143 |
| 5,881,994 A * | 3/1999 | Stevenson et al. | ......... | 251/250.5 |
| 6,148,893 A * | 11/2000 | Cadorette | ............... | 160/176.1 P |
| 6,279,978 B1 * | 8/2001 | Schreyer et al. | ............. | 296/39.3 |
| 6,295,925 B1 * | 10/2001 | Sarni et al. | ............... | 101/228 |
| 6,652,371 B2 * | 11/2003 | Kamio | ............... | 454/155 |
| 6,698,512 B2 * | 3/2004 | Forrest et al. | ................ | 165/202 |
| 6,764,376 B2 * | 7/2004 | Agostini et al. | ............. | 446/466 |
| 6,780,097 B2 * | 8/2004 | Shuttleworth et al. | ........ | 454/136 |
| 6,932,693 B2 * | 8/2005 | Nakagawa et al. | ........... | 454/137 |
| 6,959,754 B2 * | 11/2005 | Lee et al. | ......................... | 165/42 |
| 7,229,348 B2 * | 6/2007 | Shibata | ......................... | 454/155 |
| 7,563,156 B2 * | 7/2009 | Anderson | ..................... | 451/353 |
| 7,581,463 B2 * | 9/2009 | Jacobs et al. | .................... | 74/406 |
| 7,913,746 B2 * | 3/2011 | Hirooka et al. | ................. | 165/42 |
| 7,955,006 B1 * | 6/2011 | Harvey | ........................... | 396/428 |
| 8,033,899 B2 * | 10/2011 | Ichikawa et al. | ................ | 454/69 |
| 8,041,262 B2 * | 10/2011 | Carter et al. | ................... | 399/167 |
| 2003/0037918 A1 | 2/2003 | Lee et al. | | |
| 2005/0005532 A1 * | 1/2005 | Ichikawa et al. | ............... | 52/79.1 |
| 2005/0087332 A1 * | 4/2005 | Umeo et al. | ................... | 165/202 |
| 2006/0207471 A1 * | 9/2006 | Todori et al. | .................. | 105/396 |
| 2006/0260458 A1 * | 11/2006 | Friend | ............................. | 83/788 |

(Continued)

FOREIGN PATENT DOCUMENTS

EP 2018984 A2 * 1/2009
FR 2762889 A1 11/1998

OTHER PUBLICATIONS

European Search Report received Jun. 7, 2010 (4 pages).

*Primary Examiner* — Steven B McAllister
*Assistant Examiner* — Helena Kosanovic

(57) ABSTRACT

The invention relates to an HVAC vent control system. There is a need for a mechanism by which an operator can easily adjust HVAC vent controls for vents remote from the operator. A roof panel forms a set of air vents and ports. A vent control unit includes left and right door units mounted for rotation on the panel. Each door unit has a louver door and a gear piece connected thereto. The louver doors are movable to control airflow through the ports. The gear pieces are in meshing engagement with the other so that the door units operate symmetrically with respect to each other. A control knob is coupled to the one of the gear pieces so that rotation of the knob causes rotation of the first and second gear pieces and corresponding movement of the left and right louver doors.

1 Claim, 5 Drawing Sheets

U.S. PATENT DOCUMENTS

| | | | |
|---|---|---|---|
| 2007/0232215 A1* | 10/2007 | Mateus | 454/107 |
| 2008/0041557 A1* | 2/2008 | Braun | 165/42 |
| 2008/0179013 A1* | 7/2008 | Embry et al. | 156/540 |
| 2010/0216386 A1* | 8/2010 | Bruss | 454/136 |
| 2010/0269530 A1* | 10/2010 | Ichikawa | 62/244 |
| 2011/0061414 A1* | 3/2011 | Mcallister et al. | 62/244 |

* cited by examiner

VENT CONTROL SYSTEM

FIELD OF THE INVENTION

The present invention relates to a vehicle conditioned air vent control system.

BACKGROUND OF THE INVENTION

It has been proposed to place vehicle heating, ventilation and air conditioning (HVAC) systems in the roofs of vehicles, such as tractors. Roof HVAC system designs are described in U.S. Pat. No. 6,780,097, issued 24 Aug. 2004, and in patent application Ser. No. 11/518,050, filed 8 Sep. 2006, both assigned to the assignee of the present application. In order to keep the height of the HVAC system as low as possible, the components of the system must be spread out across much of the roof area. Conditioned air from such an HVAC system blows into the vehicle cab through several vents formed in the roof. Each vent may have adjustable louvers so that airflow through each vent may be controlled individually. Some of the vents may be positioned at a distance from the operator which prevents the operator from comfortably reaching the vents to adjust the louvers. It is desired to provide a mechanism by which an operator can easily adjust air flow through vents which are remote from the operator.

SUMMARY OF THE INVENTION

Accordingly, an object of this invention is to provide a system which allows an operator to easily adjust air flow through vents which are remote from the operator.

This and other objects are achieved by the present invention, wherein a roof panel forms a portion of a chamber for receiving conditioned air from a roof-mounted HVAC system. The panel includes a set of left air vents and a set right air vents. The panel includes a plurality of walls which form a set of left ports and a set of right ports. Each left port communicates with a corresponding one of the left vents, and each right port communicates with a corresponding one of the right vents. The left and right ports and vents are preferably symmetrical with respect to each other. A vent control unit includes a left door unit and a right door unit. Both door units are mounted for rotation on the panel. Each door unit has a louver door and a gear piece connected thereto. The louver door of the left door unit is movable to control airflow through the left ports. The louver door of the right door unit is movable to control airflow through the right ports. The gear pieces are in meshing engagement with the other so that the door units operate symmetrically with respect to each other. An actuator or control knob is operable by an operator and is operatively coupled to the one of the gear pieces so that operation of the actuator causes rotation of the first and second gear pieces and corresponding movement of the first and second louver doors.

DESCRIPTION OF THE PREFERRED EMBODIMENT

Figure 1:
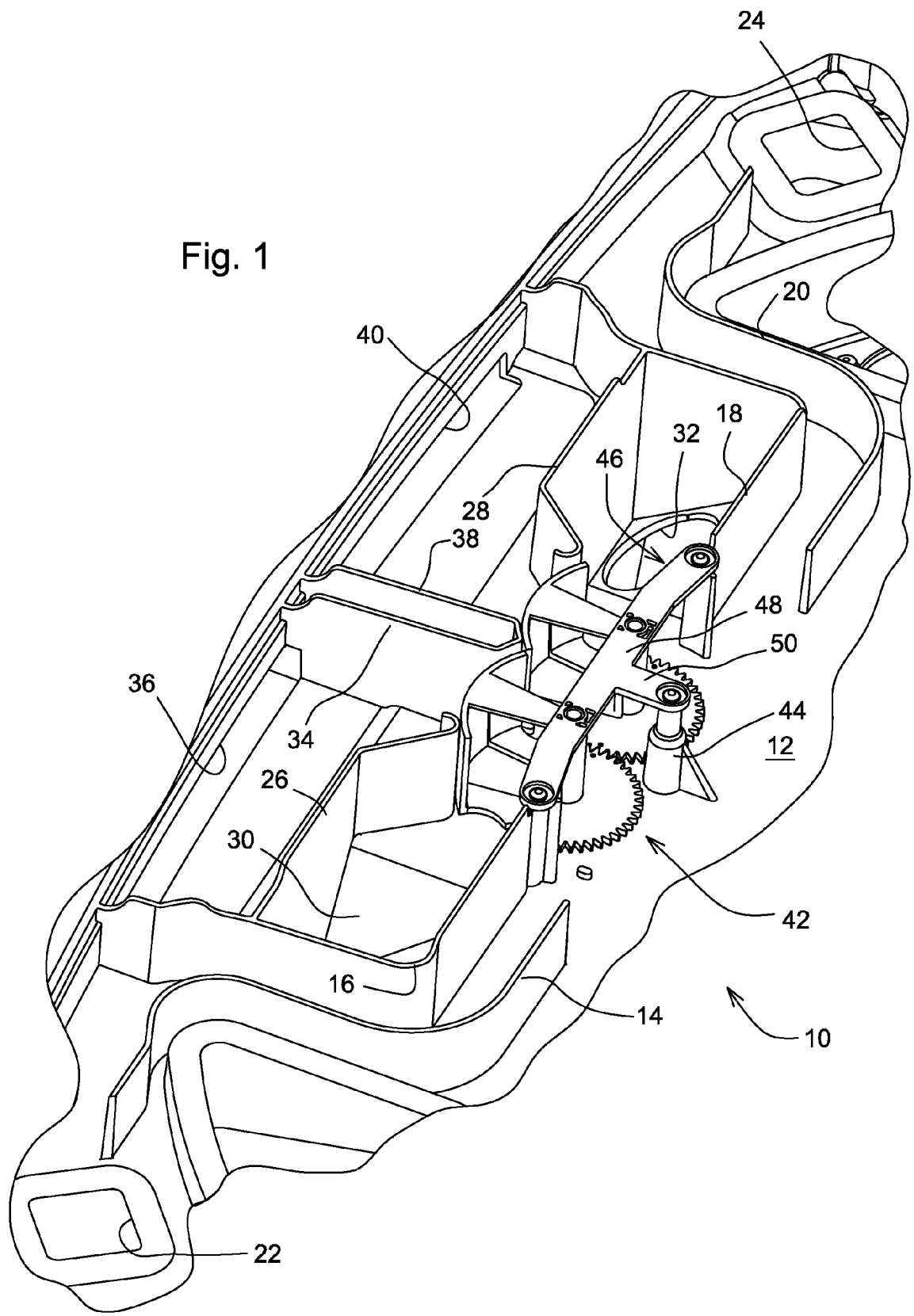
FIG. 1 is a perspective top view of an inner roof panel with a vent control system according to the present invention.

Referring to FIG. 1, there is shown the upper side of an inner roof panel 10 for a cab of a vehicle, such as a tractor. A central region of the panel 10 forms a portion of a chamber 12 which receives conditioned air from an HVAC unit (not shown). Walls 14 and 16 direct conditioned air to left floor opening 22 which is connected to a left cab floor vent (not shown) by conduits (not shown). Walls 18 and 20 direct conditioned air to right floor opening 24 which is connected to a right cab floor vent (not shown) by conduits (not shown).

Walls 16 and 26 direct air to a left A/C vent 30. Walls 18 and 28 direct air to a right A/C vent 32. Walls 16, 26 and 34 direct air to a left windshield defogger vent 36. Walls 18, 28 and 38 direct air to a right windshield defogger vent 40. Walls 34 preferably extend in a fore-and-aft direction and are symmetrical about a central fore-and-aft plane. A mode control unit 42 is mounted on the panel 10 and controls air flow from area 12 to vents 22, 24, 30, 32, 36 and 40. A support post 44 projects from the panel 10 mid-way between the inner edges of walls 14 and 20. A retainer bracket 46 has a main arm 48 and a branch arm 50. Opposite ends of arm 48 are mounted on the inner ends of walls 16 and 18. The end of branch arm 50 is supported by post 44. The walls are preferably molded with the panel 10 and form passages to the vents. These passages and vents make possible four airflow modes for air exiting the forward portion of the cabin—defog, defog/foot, AC, and all. Vents 22, 24, 30, 32, 36 and 40 may be arranged symmetrically about walls 34 and 38.

Figure 2:
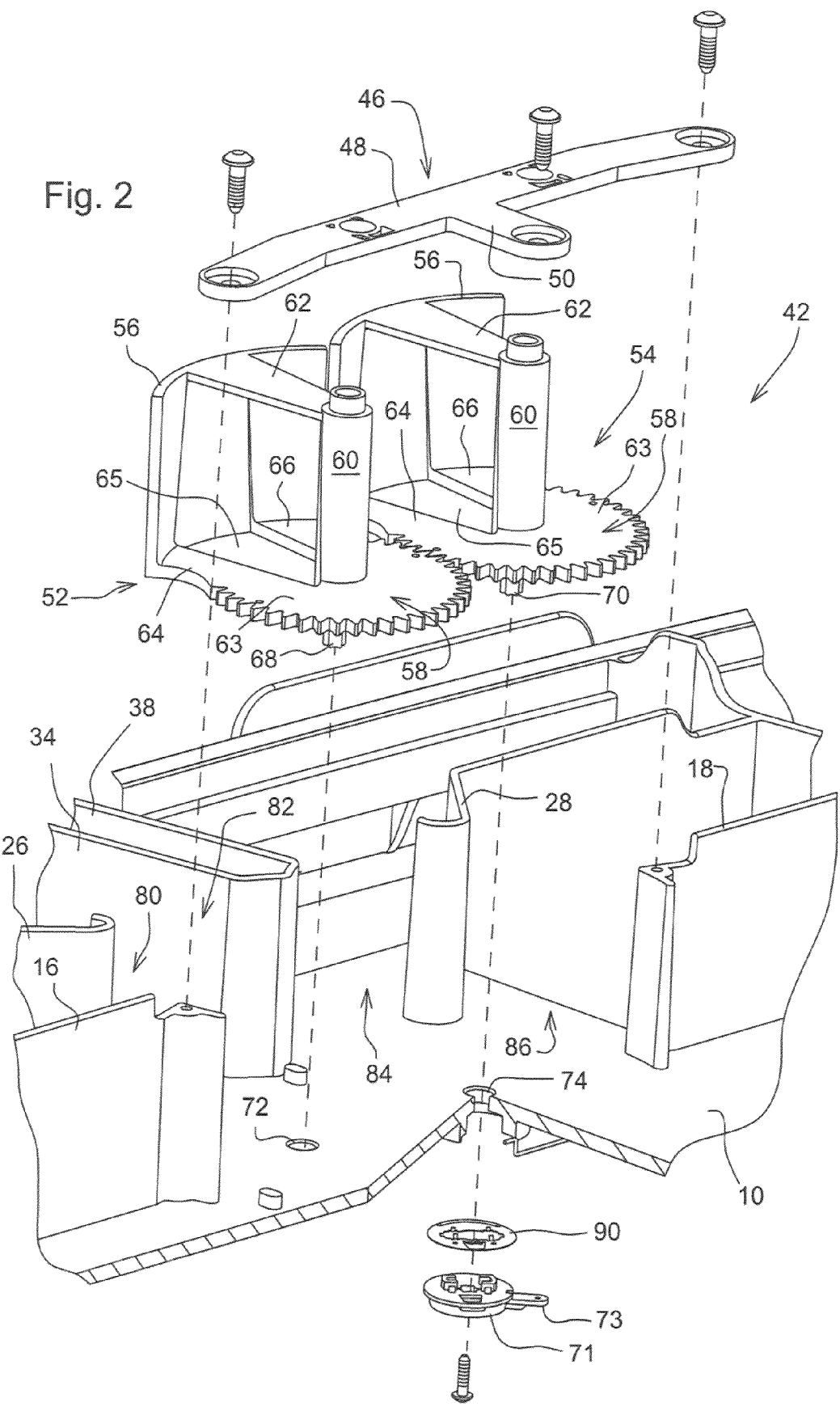
FIG. 2 is an exploded top perspective view of a portion of FIG. 1.
Figure 3:
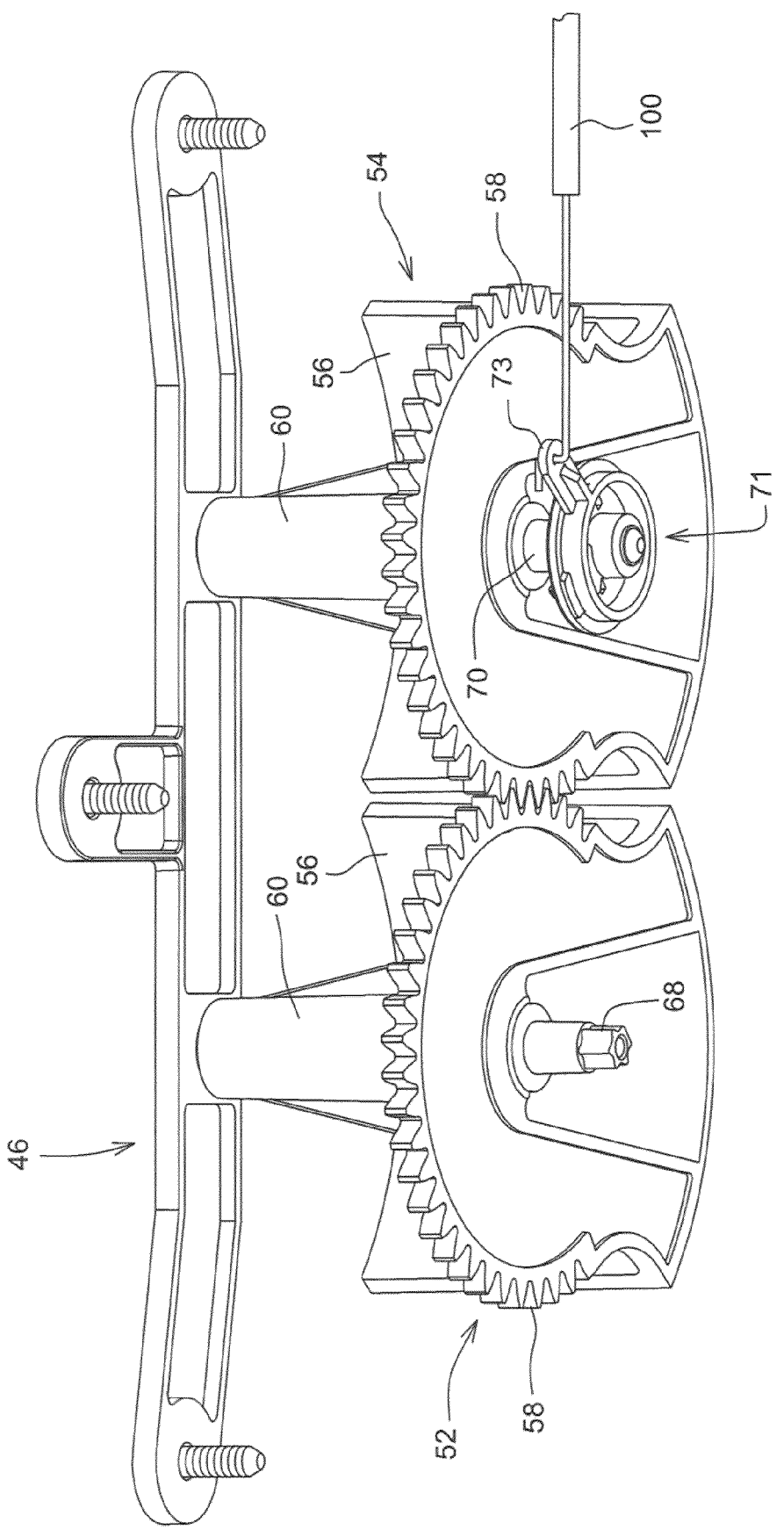
FIG. 3 is a bottom perspective view of the vent control unit of FIG. 1 with the roof panel removed.

As best seen in FIGS. 2 and 3, the vent or mode control unit 42 includes a pair of (preferably identical) first and second door units 52 and 54 mounted for rotation between the panel 10 and the bracket 46. Each door unit includes a louver door 56, a lower plate 58, and a pivot pin 60. Each door unit also includes an upper arm 62 which connects an upper edge of door 56 to an upper part of pin 60. Lower plate 58 includes a circular hub portion 63 from which project a pair of lower arms 64, 66 which connect a lower corner of door 56 to a lower part of pin 60. A smaller diameter end 68, 70 of each pin projects through and is rotatably received by a corresponding bore 72, 74 in the panel 10. As a result, the door units 52 and 54 are in a clamshell type arrangement where the motion of each door unit is tied to the other by the lower plates 58. As best seen in FIG. 2, each hub portion 63 has a diameter which is larger than the width of the upper arm 62 and which is similar to the width of the door 56, and the lower arms 64 and 66 are separated by a slot 65. The slot 65 preferably has a size and shape which is similar to the size and shape of the upper arm 62. Each lower plate 58 includes the lower arms 64 and 66 integrally formed with the hub portion 63, and gear teeth are integrally formed on the outer edge of the hub portions 63.

An port 80, communicated with vent 30, is formed by the inner ends of walls 16 and 26. An port 82, communicated with vent 36, is formed by the inner ends of walls 26 and 34. An port 84, communicated with vent 40, is formed by the inner ends of walls 34 and 28. An port 86, communicated with vent 32, is formed by the inner ends of walls 28 and 18. The left ports 80 and 82 and the right ports 84 and 86 are symmetrical with respect to each other. Door unit 52 is rotatable about the axis of its pin 60 to control airflow through ports 80 and 82. Door unit 54 is rotatable about the axis of its pin 60 to control airflow through ports 84 and 86. The gear members 58 are in meshing engagement with the each other. The pin ends 68 and 70 have splines.

Figure 4:
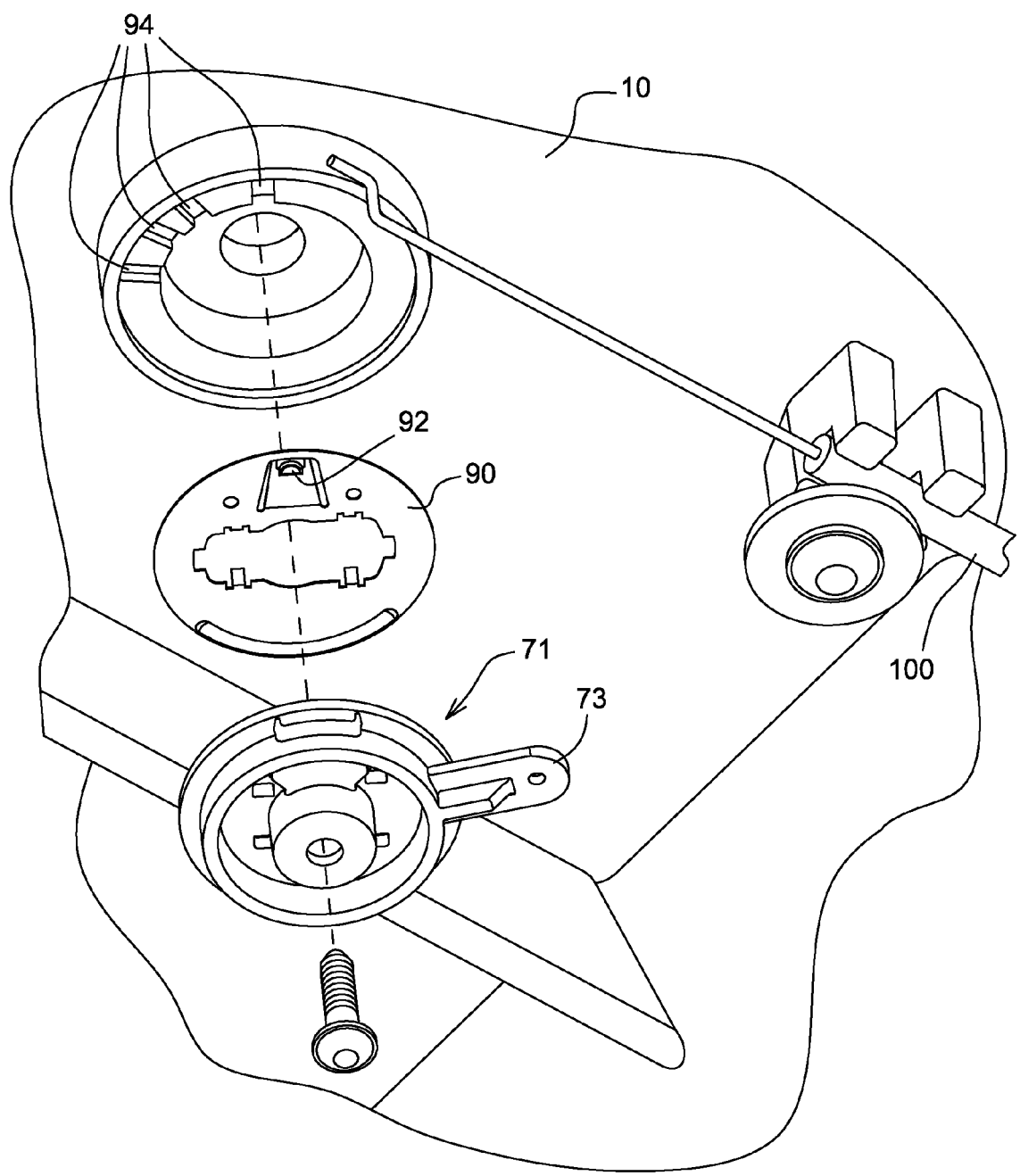
FIG. 4 is a bottom perspective detailed view showing the cam member and detent spring of the present invention.

Referring now to FIGS. 2 and 4, a cam member 71 is mounted on the splines of pin end 70 so that cam member 71 is non-rotatably coupled to pin 60 of door unit 54. An arm 73 projects from the round body of cam member 71. A known detent spring member 90 is placed between the cam member 71 and the panel 10 and is mounted for rotation with the cam member 71. As best seen in FIG. 4, the spring member 90 has a detent tab 92 which cooperates in a known manner with detent recesses 94 formed in the bottom surface of panel 10 to releasable hold the door members 52 and 54 in a plurality of desired positions to open and close the ports 80-86.

Figure 5:
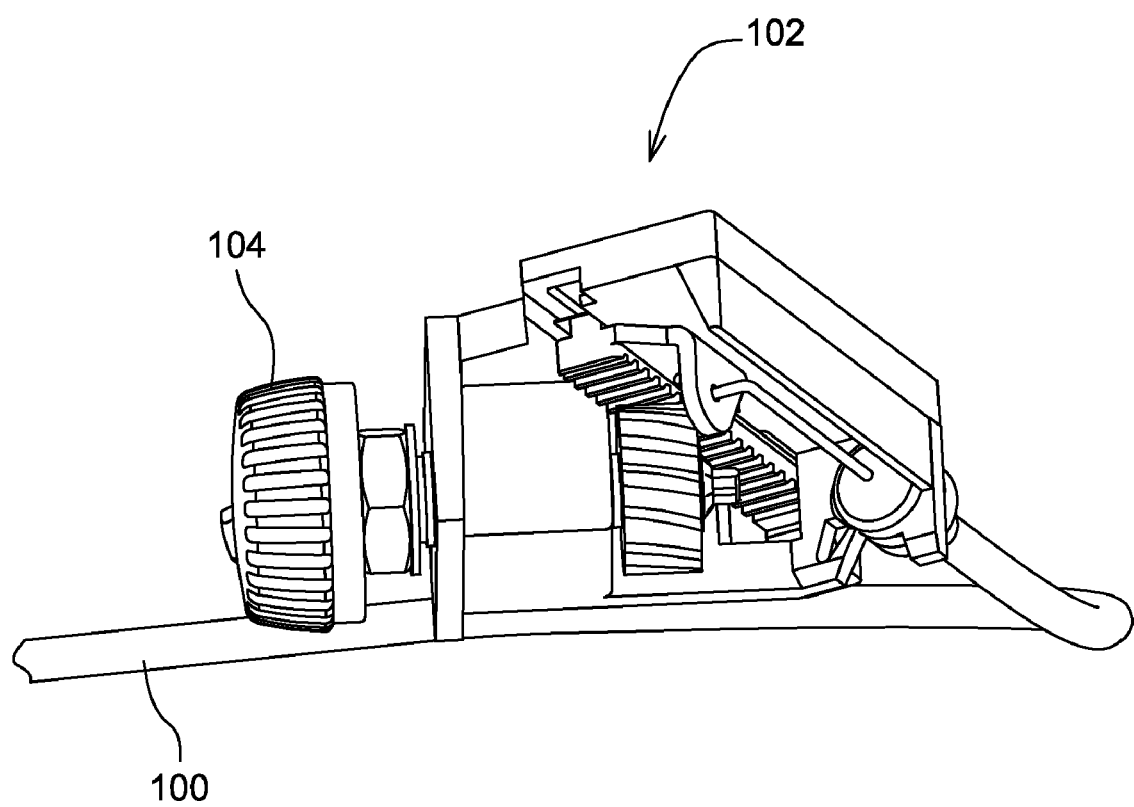
FIG. 5 is perspective view of a control knob unit for use with the present invention.

As best seen in FIG. 3, an end of a Bowden type cable 100 is coupled to the arm 73 of cam member 71. As best seen in FIG. 5, the other end of cable 100 is coupled to a known operator rotatable actuator or control knob unit 102 with knob 104 which may be mounted in a location in the vehicle cab so that it may be easily reached and manipulated by an operator of the vehicle. Instead of a mechanical cable, the door units 52 and 54 could be rotated by an electric or hydraulic motor responding to a suitable electric or hydraulic device coupled to the knob 104.

With this system, when the operator rotates the knob 104 of control knob unit 102, the cable 100 pivots or rotates the cam member 71 and thereby rotates door member 54 because of the meshing engagement of gear pieces 58, the rotation of door member 54 causes door member 52 to rotate in the opposite direction, so that the door members 52 and 54 operate symmetrically with respect to each other. With this invention, airflow mode control is provided for air vents too far to reach without standing up.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A vehicle HVAC vent control system comprising:
   a roof panel of the vehicle;
   a plurality of walls on the roof panel, the walls defining a plurality of ports between the walls leading to a plurality of ducts, the ducts directing conditioned air to a plurality of vents; and
   first and second door units mounted for rotation on the roof panel, each door unit having a hub, and a pivot pin, a curved door having a center of curvature substantially at the pivot pin a first end of the pivot pin rotatably engaging the roof panel and the hub having gear teeth integrally formed on an outer edge thereof, and the hub integrally forming an arm which connects the pivot pin to the door, the hub, arm and gear teeth being positioned on the same side of the roof panel, each curved door being movable to control airflow through a corresponding one of the ports, the gear teeth of the first door unit being in meshing engagement with the gear teeth of the second door unit, the first end of each pivot pin being received by the roof panel a bracket having an arm which rotatably supports a second end of each pivot pin, and the arm of the bracket having a first end which is connected to a first one of the plurality of walls, and the arm of the bracket having a second end which is connected to a second one of the plurality of walls.

\* \* \* \* \*